United States Patent [19]

Yu

[11] Patent Number: 5,240,532
[45] Date of Patent: Aug. 31, 1993

[54] PROCESS FOR HEAT TREATING A FLEXIBLE ELECTROSTATOGRAPHIC IMAGING MEMBER

[75] Inventor: Robert C. U. Yu, Webster, N.Y.

[73] Assignee: Xerox Corporation, Stamford, Conn.

[21] Appl. No.: 815,094

[22] Filed: Dec. 27, 1991

[51] Int. Cl.$^5$ .............................................. C03G 5/00
[52] U.S. Cl. .................... 156/137; 156/304.1; 264/345; 430/127; 430/132
[58] Field of Search ............................ 156/304.1, 137; 264/235, 235.6, 339, 342 R, 342 RE, 345, 346; 430/127, 132

[56] References Cited

U.S. PATENT DOCUMENTS

| | | | |
|---|---|---|---|
| 2,897,546 | 8/1959 | Clapp et al. | 264/339 |
| 2,964,796 | 12/1960 | Press | 264/339 |
| 3,988,399 | 10/1976 | Evans | 264/22 |
| 4,006,019 | 2/1977 | Karam | 264/235 |
| 4,093,683 | 6/1978 | Harley | 264/339 |
| 4,532,166 | 7/1985 | Thomsen et al. | 428/27 |
| 4,747,992 | 5/1988 | Sypula et al. | 264/345 |
| 4,755,337 | 7/1988 | Takahashi et al. | 264/235 |
| 4,840,873 | 6/1989 | Kobayashi et al. | 430/273 |
| 5,021,109 | 6/1991 | Petropoulos et al. | 156/137 |

Primary Examiner—Jill L. Heitbrink

[57] ABSTRACT

A process for treating a flexible electrostatographic imaging web including providing a flexible base layer and a layer including a thermoplastic polymer matrix comprising forming at least a segment of the web into an arc having a radius of curvature between about 10 millimeters and about 25 millimeters measured along the inwardly facing exposed surface of the base layer, the arc having an imaginary axis which traverses the width of the web, heating at least the polymer matrix in the segment to at least the glass transition temperature of the polymer matrix, and cooling the imaging member to a temperature below the glass transition temperature of the polymer matrix while maintaining the segment of the web in the shape of the arc.

16 Claims, No Drawings

PROCESS FOR HEAT TREATING A FLEXIBLE ELECTROSTATOGRAPHIC IMAGING MEMBER

BACKGROUND OF THE INVENTION

This invention relates in general to a fabrication process and more specifically, to a process for heat treating a flexible electrostatographic imaging member.

Flexible electrostatographic belt imaging members are well known in the art. Typical electrostatographic flexible belt imaging members include, for example, photoreceptors for electrophotographic imaging systems and electroreceptors or ionographic imaging members for electrographic imaging systems. These belts are usually formed by cutting a rectangular sheet from a web, overlapping opposite ends, and welding the overlapped ends together to form a welded seam.

Flexible electrophotographic imaging member belts are usually multilayered photoreceptors that comprise a substrate, an electrically conductive layer, an optional hole blocking layer, an adhesive layer, a charge generating layer, and a charge transport layer and, in some embodiments, an anti-curl backing layer. One type of multilayered photoreceptor comprises a layer of finely divided particles of a photoconductive inorganic compound dispersed in an electrically insulating organic resin binder. U.S. Pat. No. 4,265,990 discloses a layered photoreceptor having separate charge generating (photogenerating) and charge transport layers. The charge generating layer is capable of photogenerating holes and injecting the photogenerated holes into the charge transport layer.

Although excellent toner images may be obtained with multilayered belt photoreceptors, it has been found that as more advanced, higher speed electrophotographic copiers, duplicators and printers were developed, cracking of the charge transport layer and/or welded seam was encountered during cycling or when less durable materials are used. Since cracks in the photoreceptor surface cause print defects in the final copy, their appearance shortens the belt service life. However, seam cracking creates a deposition site where toner, carrier, paper debris, and dirt accumulate and eventually cause premature cleaning blade failure during photoreceptor belt machine cycling.

There is also a great need for long service life flexible belt photoreceptors in compact imaging machines that employ small diameter support rollers for photoreceptor belt systems operating in a very confined space. Small diameter support rollers are also highly desirable for simple, reliable copy paper stripping systems which utilize the beam strength of the copy paper to automatically remove copy paper sheets from the surface of a photoreceptor belt after toner image transfer. Unfortunately, small diameter rollers, e.g. less than about 0.75 inch (19 mm) diameter, raise the threshold of mechanical performance criteria to such a high level that photoreceptor belt charge transport layer and/or seam failure due to induced bending stress can become unacceptable for multilayered belt photoreceptor applications. Regarding welded seam failure, the welding operation causes a seam "splash" of melted material to form at the seam, the splash having an exposed edge which forms a 90° angle where it contacts the surface of the charge transport layer. Under dynamic fatiguing conditions, the junction between the splash edge and the charge transport surface layer provides a focal point for stress concentration and becomes a point of failure in the mechanical integrity of the belt. Dynamic fatigue at this stress concentration point facilitates tear initiation through the charge transport layer. This tear then propagates through the weak charge generating layer/adhesive layer interfacial link to produce local seam delamination.

Also, in liquid development systems, induced bending stress coupled with contact with liquid developers accelerates cracking of the charge transport layer and/or welded seam. Frequent photoreceptor delamination has a serious impact on the versatility of a photoreceptor and reduces its practical value for automatic electrophotographic copiers, duplicators and printers.

Although the foregoing was discussed in terms of an electrophotographic imaging belt, they problems described equally applicable to electrographic imaging belts.

INFORMATION DISCLOSURE STATEMENT

U.S. Pat. No. 5,021,109 to Petropoulous et al., assigned to Xerox Corporation, issued Jun. 4, 1991, appears to disclose a process for preparing a multilayered belt comprising the steps of: (1) heating a substrate in a form of a tubular sleeve and formed of a polymeric material to at least about a glass transition temperature of the polymeric material, so as to expand the tubular sleeve; (2) placing the expanded tubular sleeve on a mandrel; (3) treating the tubular sleeve by applying one or more coating to form multilayered composite belt; (4) layers on the sleeve to form a heating the composite belt to at least about the glass transition temperature of the polymeric material of the tubular sleeve; and (5) cooling the composite belt.

U.S. Pat. No. 4,840,873 to Kobayashi et. al. issued Jun. 20, 1989, appears to disclose a process for producing an optical recording medium comprising the step of heat-treating an optical recording medium comprising a plastic substrate having a surface of minutely roughened structure and a thin metal film formed on the surface. The optical recording medium is heated at a temperature within a range which is lower by 80° C. and higher by 60° C. than the glass transition temperature of the plastic substrate.

U.S. Pat. No. 4,532,166 to Thomsen et al., assigned to Xerox Corporation, issued Jul. 30, 1985, appears to disclose a welded web which is prepared by overlapping a first edge over a second edge, then applying heat necessary to bond the first edge with the second edge. The heating techniques may include ultrasonic welding, radio frequency heating, and the like.

U.S. Pat. No. 3,988,399 to Evans, issued Oct. 26, 1976, appears to disclose heat recoverable articles which have an elongate 5-shaped configuration, which latter can be wrapped about a substrate. The articles comprise a molecularly oriented unitary polymeric layer which has been differentially annealed while restrained against dimensional change and crosslinking.

Thus, there is a continuing need for electrostatographic imaging belts having improved resistance to cracking.

SUMMARY OF THE INVENTION

It is, therefore, an object of the present invention to provide an improved electrostatographic imaging belt which overcomes the above-noted deficiencies.

It is yet another object of the present invention to provide an improved an electrostatographic imaging belt.

It is still another object of the present invention to provide an improved electrostatographic imaging belt having an imaging layer which exhibits greater resistance to cracking.

It is another object of the present invention to provide an improved electrostatographic imaging belt having a welded seam which exhibits greater resistance to cracking.

It is yet another object of the present invention to provide an improved electrostatographic imaging belt which has longer cycling life in a liquid development environment.

The foregoing objects and others are accomplished in accordance with this invention by providing a stress free state in the imaging layer when the electrostatographic imaging belt flexes over small diameter support rollers.

A process for treating a flexible electrostatographic imaging web comprising providing a flexible base layer and a layer comprising a thermoplastic polymer matrix comprising forming at least a segment of the web into an arc having a radius of curvature between about 10 millimeters and about 25 millimeters measured along the inwardly facing exposed surface of the substrate layer, the arc having an imaginary axis which traverses the width of the web, heating at least the polymer matrix in the segment to at least the glass transition temperature of the polymer matrix, and cooling the imaging member to a temperature below the glass transition temperature of the polymer matrix while maintaining the segment of the web in the shape of the arc.

DETAILED DESCRIPTION OF THE PREFERRED EMBODIMENTS

Electrostatographic flexible belt imaging members are well known in the art. Typically, a flexible substrate is provided having an electrically conductive surface. For electrophotographic imaging members, at least one photoconductive layer is then applied to the electrically conductive surface. A charge blocking layer may be applied to the electrically conductive layer prior to the application of the photoconductive layer. If desired, an adhesive layer may be utilized between the charge blocking layer and the photoconductive layer. For multilayered photoreceptors, a charge generation binder layer is usually applied onto an adhesive layer, if present, or directly over the blocking layer, and a charge transport layer is subsequently formed on the charge generation layer. For ionographic imaging members, an electrically insulating dielectric imaging layer is applied to the electrically conductive surface. The substrate may contain an optional anti-curl back coating on the side opposite from the side bearing the charge transport layer or dielectric imaging layer. This substrate, alone or in combination with the optional anti-curl back coating, is hereinafter referred to as a base layer.

The substrate may be opaque or substantially transparent and may comprise numerous suitable materials having the required mechanical properties. Accordingly, the substrate may comprise a layer of an electrically non-conductive or conductive material such as an inorganic or an organic composition. As electrically non-conducting materials, there may be employed various resins known for this purpose including polyesters, polycarbonates, polyamides, polyurethanes, polysulfones, and the like which are flexible as thin webs. The electrically insulating or conductive substrate should be flexible and in the form of an endless flexible belt. Preferably, the endless flexible belt shaped substrate comprises a commercially available biaxially oriented polyester known as Mylar, available from E. I. du Pont de Nemours & Co. or Melinex available from ICI Americas, Inc. or Hostaphan, available from American Hoechst Corporation.

The thickness of the substrate layer depends on numerous factors, including beam strength and economical considerations, and thus this layer for a flexible belt may be of substantial thickness, for example, about 175 micrometers, or of minimum thickness less than 50 micrometers, provided there are no adverse effects on the final electrostatographic device. In one flexible belt embodiment, the thickness of this layer ranges from about 65 micrometers to about 150 micrometers, and preferably from about 75 micrometers to about 100 micrometers for optimum flexibility and minimum stretch when cycled around small diameter rollers, e.g. 19 millimeter diameter rollers.

The conductive layer may vary in thickness over substantially wide ranges depending on the optical transparency and degree of flexibility desired for the electrostatographic member. Accordingly, for a flexible photoresponsive imaging device, the thickness of the conductive layer may be between about 20 angstrom units to about 750 angstrom units, and more preferably from about 100 Angstrom units to about 200 angstrom units for an optimum combination of electrical conductivity, flexibility and light transmission. The flexible conductive layer may be an electrically conductive metal layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. Generally, for rear erase exposure, a conductive layer light transparency of at least about 15 percent is desirable. The conductive layer need not be limited to metals. Other examples of conductive layers may be combinations of materials such as conductive indium tin oxide as a transparent layer for light having a wavelength between about 4000 Angstroms and about 7000 Angstroms or a transparent copper iodide (CuI) or a conductive carbon black dispersed in a plastic binder as an opaque conductive layer. A typical electrical conductivity for conductive layers for electrophotographic imaging members in slow speed copiers is about $10^2$ to $10^3$ ohms/square.

After formation of an electrically conductive surface, a charge blocking layer may be applied thereto to photoreceptors. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. The blocking layer may be nitrogen containing siloxanes or nitrogen containing titanium compounds as disclosed, for example, in U.S. Pat. Nos. 4,338,387, 4,286,033 and 4,291,110. The disclosures of U.S. Pat. Nos. 4,338,387, 4,286,033 and 4,291,110 are incorporated herein in their entirety. A preferred blocking layer comprises a reaction product between a hydrolyzed silane and the oxidized surface of a metal ground plane layer. The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layers are preferably applied in the form of a dilute solution, with the solvent being removed after deposition of the coating by conventional techniques such as by vacuum, heating and the like. The blocking layer should be continuous and have a thickness of less than about 0.2 micrometer because greater thickness may lead to undesirably high residual voltage.

An optional adhesive layer may applied to the hole blocking layer. Any suitable adhesive layer well known in the art may be utilized. Typical adhesive layer materials include, for example, polyesters, duPont 49,000 (available from E. I. duPont de Nemours and Company), Vitel PE100 (available from Goodyear Tire & Rubber), polyurethanes, and the like. Satisfactory results may be achieved with adhesive layer thickness between about 0.05 micrometer (500 angstroms) and about 0.3 micrometer (3,000 angstroms). Conventional techniques for applying an adhesive layer coating mixture to the charge blocking layer include spraying, dip coating, roll coating, wire wound rod coating, gravure coating, Bird applicator coating, and the like. Drying of the deposited coating may be effected by any suitable conventional technique such as oven drying, infra red radiation drying, air drying and the like.

Any suitable photogenerating layer may be applied to the adhesive blocking layer which can then be overcoated with a contiguous hole transport layer as described hereinafter. Examples of typical photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigment such as the X-form of metal free phthalocyanine described in U.S. Pat. No. 3,357,989, metal phthalocyanines such as vanadyl phthalocyanine and copper phthalocyanine, dibromoanthanthrone, squarylium, quinacridones available from DuPont under the tradename Monastral Red, Monastral violet and Monastral Red Y, Vat orange 1 and Vat orange 3 trade names for dibromo anthanthrone pigments, benzimidazole perylene, substituted 2,4-diamino-triazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like dispersed in a film forming polymeric binder. Multi-photogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired. Charge generating binder layers comprising particles or layers comprising a photoconductive material such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof are especially preferred because of their sensitivity to white light. Vanadyl phthalocyanine, metal free phthalocyanine and tellurium alloys are also preferred because these materials provide the additional benefit of being sensitive to infrared light.

Any suitable polymeric film forming binder material may be employed as the matrix in the photogenerating binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloridevinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

The photogenerating layer containing photoconductive compositions and/or pigments and the resinous binder material generally ranges in thickness of from about 0.1 micrometer to about 5.0 micrometers, and preferably has a thickness of from about 0.3 micrometer to about 3 micrometers. The photogenerating layer thickness is related to binder content. Higher binder content compositions generally require thicker layers for photogeneration. Thickness outside these ranges can be selected providing the objectives of the present invention are achieved.

Any suitable and conventional technique may be utilized to mix and thereafter apply the photogenerating layer coating mixture. Typical application techniques include spraying, dip coating, roll coating, wire wound rod coating, and the like. Drying of the deposited coating may be effected by any suitable conventional technique such as oven drying, infra red radiation drying, air drying and the like.

The active charge transport layer may comprise an activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer. An especially preferred transport layer employed in one of the two electrically operative layers in the multilayered photoconductor of this invention comprises from about 25 percent to about 75 percent by weight of at least one charge transporting aromatic amine compound, and about 75 percent to about 25 percent by weight of a polymeric film forming resin in which the aromatic amine is soluble.

The charge transport layer forming mixture preferably comprises an aromatic amine compound.

Examples of charge transporting aromatic amines represented by the structural formulae above for charge transport layers capable of supporting the injection of photogenerated holes of a charge generating layer and transporting the holes through the charge transport layer include triphenylmethane, bis(4-diethylamine-2-methylphenyl)phenylmethane; 4'-4''-bis(diethylamino)-2',2''-dimethyltriphenylmethane, N,N'-bis(alkylphenyl)-[1,1'-biphenyl]-4,4'-diamine wherein the alkyl is, for example, methyl, ethyl, propyl, n-butyl, etc., N,N'-diphenyl-N,N'-bis(chlorophenyl)-[1,1'-biphenyl]-4,4'-diamine, N,N'-diphenyl-N,N'-bis(3''-methylphenyl)-(1,1'-biphenyl)-4,4'-diamine, and the like dispersed in an inactive resin binder.

Any suitable inactive thermoplastic resin binder soluble in methylene chloride or other suitable solvent may be employed in the process of this invention to form the thermoplastic polymer matrix of the imaging member. Typical inactive resin binders soluble in methylene chloride include polycarbonate resin, polyvinylcarbazole, polyester, polyarylate, polyacrylate, polyether, polysulfone, polystyrene, and the like. Molecular weights can vary from about 20,000 to about 150,000.

Any suitable and conventional technique may be utilized to mix and thereafter apply the charge transport layer coating mixture to the charge generating layer. Typical application techniques include spraying, dip coating, roll coating, wire wound rod coating, and the like. Drying of the deposited coating may be effected by any suitable conventional technique such as oven drying, infra red radiation drying, air drying and the like.

Generally, the thickness of the charge transport layer is between about 10 to about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

The preferred electrically inactive resin materials are polycarbonate resins have a molecular weight from about 20,000 to about 150,000, more preferably from about 50,000 to about 120,000. The materials most preferred as the electrically inactive resin material is poly(4,4'-dipropylidene-diphenylene carbonate) with a molecular weight of from about 35,000 to about 40,000, available as Lexan 145 from General Electric Company; poly(4,4'-isopropylidene-diphenylene carbonate) with a molecular weight of from about 40,000 to about 45,000, available as Lexan 141 from the General Electric Company; a polycarbonate resin having a molecular weight of from about 50,000 to about 120,000, available as Makrolon from Farbenfabricken Bayer A. G. and a polycarbonate resin having a molecular weight of from about 20,000 to about 50,000 available as Merlon from Mobay Chemical Company. Methylene chloride solvent is a desirable component of the charge transport layer coating mixture for adequate dissolving of all the components and for its low boiling point.

Examples of photosensitive members having at least two electrically operative layers include the charge generator layer and diamine containing transport layer members disclosed in U.S. Pat. No. 4,265,990, U.S. Pat. No. 4,233,384, U.S. Pat. No. 4,306,008, U.S. Pat. No. 4,299,897 and U.S. Pat. No. 4,439,507. The disclosures of these patents are incorporated herein in their entirety. The photoreceptors may comprise, for example, a charge generator layer sandwiched between a conductive surface and a charge transport layer as described above or a charge transport layer sandwiched between a conductive surface and a charge generator layer.

If desired, a charge transport layer may comprise electrically active resin materials instead of or mixtures of inactive resin materials with activating compounds. Electrically active resin materials are well known in the art. Typical electrically active resin materials include, for example, polymeric arylamine compounds and related polymers described in U.S. Pat. No. 4,801,517, U.S. Pat. No. 4,806,444, U.S. Pat. No. 4,818,650, U.S. Pat. No. 4,806,443 and U.S. Pat. No. 5,030,532. Polyvinylcarbazole and derivatives of Lewis acids described in U.S. Pat. No. 4,302,521. Electrically active polymers also include polysilylenes such as poly(methylphenyl silylene), poly(methylphenyl silylene-co-dimethyl silylene), poly(cyclohexylmethyl silylene), poly(tertiarybutylmethyl silylene), poly(phenylethyl silylene), poly(n-propylmethyl silylene), poly(p-tolylmethyl silylene), poly(cyclotrimethylene silylene), poly(cyclotetramethylene silylene), poly(cyclopentamethylene silylene), poly(di-t-butyl silylene-co-di-methyl silylene), poly(diphenyl silylene-co-phenylmethyl silylene), poly(cyanoethylmethyl silylene) and the like. Vinylaromatic polymers such as polyvinyl anthracene, polyacenaphthylene; formaldehyde condensation products with various aromatics such as condensates of formaldehyde and 3-bromopyrene; 2,4,7-trinitrofluoreoene, and 3,6-dinitro-N-t-butylnaphthalimide as described in U.S. Pat. No. 3,972,717. Other polymeric transport materials include poly-1-vinylpyrene, poly-9-vinylanthracene, poly-9-(4-pentenyl)-carbazole, poly-9-(5-hexyl)-carbazole, polymethylene pyrene, poly-1-(pyrenyl)-butadiene, polymers such as alkyl, nitro, amino, halogen, and hydroxy substitute polymers such as poly-3-amino carbazole, 1,3-dibromo-poly-N-vinyl carbazole and 3,6-dibromo-poly-N-vinyl carbazole and numerous other transparent organic polymeric transport materials as Described in U.S. Pat. No. 3,870,516. The disclosures of each of the patents identified above pertaining to binders having charge transport capabilities are incorporated herein by reference in their entirety.

Other layers such as conventional electrically conductive ground strip along one edge of the belt in contact with the conductive layer, blocking layer, adhesive layer or charge generating layer to facilitate connection of the electrically conductive layer of the photoreceptor to ground or to an electrical bias. Ground strips are well known and comprise usually comprise conductive particles dispersed in a film forming binder.

Optionally, an overcoat layer may also be utilized to protect the charge transport layer and improve resistance to abrasion. In some cases an anti-curl back coating may be applied to the rear side of the substrate to provide flatness and/or abrasion resistance. These overcoating and anti-curl back coating layers are well known in the art and may comprise thermoplastic organic polymers or inorganic polymers that are electrically insulating or slightly semi-conductive. Overcoatings are continuous and generally have a thickness of less than about 10 micrometers. The thickness of anti-curl backing layers should be sufficient to substantially balance the total curling forces of the layer or layers on the opposite side of the supporting substrate layer.

For electrographic imaging members, a flexible dielectric layer overlying the conductive layer may be substituted for the active photoconductive layers. Any suitable, conventional, flexible, electrically insulating, thermoplastic dielectric polymer matrix material may be used in the dielectric layer of the electrographic imaging member. If desired, the flexible belts of this invention may be used for other purposes where cycling durability is important.

The process of this invention for treating the flexible electrostatographic imaging webs described above and in the Examples below comprises bending the entire web or at least a segment of the web into an arc having an imaginary axis which transverses the width of the web. The arc should have an imaginary axis which traverses the width of the web, i.e. the axis is substantially perpendicular to an imaginary plane extending along the long edges of the web. In other words, the arc is visible when viewing a cross section taken longitudinally of the web and not when viewing a cross section taken transversely of the web. The bend in the web may merely be one relatively short segment of the web such as the region encompassing a welded seam and a small amount of areas adjacent the seam or it can include the entire web, e.g. the web may wound into the shape of a tube. In the latter embodiment, the web may or may not have a welded seam.

The arc should have a radius of curvature between about 10 millimeters and about 25 millimeters measured along the exposed surface of the substrate layer. When the radius of curvature is less than about 10 millimeters, the beam strength (rigidity) of the electrophotographic imaging web will render extremely difficult any effort to achieve bending into a very small curvature in the belt prior to heat treatment. When the radius of curvature is greater than about 25 millimeters, the benefits of the present invention are not fully realized because no significant stress release in the imaging layer is achieved. Although a true arc is preferred, the arc need not be perfectly true, i.e. it need not fully coincide with at least part of the ring of a true circle. In other words, a slight variance from a perfectly circular arc is acceptable, e.g. the shape of the arc may approach the shape of an ellipse, a parabola or hyperbola having a substantially smooth arc incrementally made up of a series of arcs having progressively increasing or decreasing radii of curvature, all of the radii having a length within the range from about 10 millimeters to about 25 millimeters. The arc should be substantially smooth with no abrupt changes in shape along the curve of the arc. Any segment of an arc having a shape that is a radical departure from a radius of curvature in the range from about 10 millimeters to about 25 millimeter can result in the formation of a bump or hump that does not fully conform to the surface of support rollers or in straight runs between support rollers thereby adversely affecting imaging performance during charging, exposure, development, transfer, cleaning and/or erase operations. However, a bump or hump can be tolerated in region of the web were a welded seam is located. This is because the seam region of an electrostatographic imaging member is not normally used for forming images. If desired, the only treated segment of the web may be the region of the web carrying the welded seam. Welded electrophotographic imaging webs are well known in the art. In a typical welded belt, the seam is prepared by overlapping opposite ends of a rectangular or square web for a distance of between about 0.5 mm and about 1.5 mm and welding the overlapped ends together by conventional techniques such as by contact with an ultrasonic welding horn. Preferably, the polymer matrix in the welded seam and a region on each side of the seam extending from about 6 mm to about 14 mm from either side of the centerline of the seam is heat treated by the process of this invention. Thus, the preferred segment size encompassing a substantially centered welded seam has an overall width of between about 12 millimeters to about 28 millimeters measured circumferentially around the belt. This segment or band ensures release of the built in internal stress to produce a stress/strain free seam region that minimizes cracking when the belt is cycled over small diameter support rollers.

Bending of the web may be accomplished by any suitable bending technique. A typical bending technique includes rolling the web into a tube for treatment of the entire web. The applying of opposite torque to the gripped opposite ends of a web to form a "U" shaped cross section, the suspending of a welded web belt from a cylindrical rod, wrapping at least a portion of a web around a cylindrical mandrel, and the like may be employed for segmented or localized stress release treatment. If the web is rolled into the shape of a hollow tube or roll and multiple overlapping layers of the web are formed, the radial distance from the center of the tube to the exposed surface (i.e. bottom) of each substrate of each overlapping web layer should fall within the range of 10 millimeters and about 25 millimeters so that the properties of belts made from parts of the same web do not vary significantly from one belt to another. Generally, as the number of web layers in a roll increase, the time required to heat the polymer matrix in each web layer to at least the glass transition temperature of the charge transport layer or the dielectric layer increases even though heat may be simultaneously applied to the interior and exterior of the roll.

While the web is bent into the arcuate shape at least the polymer matrix in the bent segment is heated to at least the glass transition temperature of the polymer matrix. As described above, the polymer matrix to be heated may the thermoplastic polymer material in the matrix of a charge transport layer of an electrophotographic imaging member or may be the thermoplastic polymer material in the matrix of a dielectric layer of an electrographic imaging member. The glass transition temperature (Tg) as employed herein is defined as the temperature at which the polymer matrix is transformed from a glassy state to a viscous liquid (rubbery) state during heating or from a viscous liquid (rubbery) state to a glassy state during cooling. Heating of the polymer matrix in the bent segment may be effected by any suitable technique. Typical heating techniques include, for example, oven heating, forced air oven heating, infrared heating, contact heating, induction heating, microwave, radio frequency heating, and the like. Focused heat may be applied by any suitable means such as a heat gun, masked infrared heating, laser heating, hot air heating, and the like.

For electrophotographic imaging member belts, the temperature to which the seam and adjacent regions are heated while maintained in an arcuate shape should be between the glass transition temperature of the charge transport layer material and about 15° C. above the glass transition temperature of the charge transport layer matrix material. Temperatures ranging to about 15° C. above the glass transition temperature tend to render the charge transport layer too tacky for handling. Temperatures below the glass transition temperature fail to significantly improve the resistance of the welded seam and adjacent regions to cracking during cycling over small diameter rollers. Preferably, the seam and adjacent regions are heated to between about 4° C. and about 10° C. above the glass transition temperature. Optimum results are achieved at temperatures between about 5° C. and about 8° C. above the glass transition temperature. Since attainment of the temperature achieved in the charge transport layer is important, the time of heating should be sufficient to achieve the temperatures described above.

The seam and the adjacent region can be heat treated in accordance with the process of this invention during formation of the welded seam, i.e. during welding of the seam, or at some time subsequent to seam formation. If heat treated in accordance with the process of this invention during welding, the heat generated by conventional seam welding operations is sufficient to heat the seam and the area adjacent thereto to at least the glass transition temperature of the charge transport layer. It is important, however that the segment of the belt containing the seam be in the shape of an arc having a radius of curvature between about 10 millimeters and about 25 millimeters. In a typical embodiment involving heating of the segment of the belt containing the seam subsequent to seam formation, a belt photoreceptor is hung on a cantilevered horizontal rod to form a loop hanging downwardly from the horizontal rod. A second rod is inserted at the bottom of the loop with the rod ends extending beyond the edges of the belt. A small weight is hung from the ends of the second rod. The seam of the photoreceptor is positioned at the top of the cantilevered rod or beneath the bottom rod. The rod adjacent to the seam has an arcuate surface, the arc having a small radius of curvature, e.g., 9.5 mm. The seam and the adjacent region are thereafter heated to at least the glass transition temperature of the charge transport layer. Heat may be applied with a heat gun or other suitable device. Alternatively, a solid metal heating member having a concave channel can be brought into contact with substantially the entire exposed surface of the curved seam and the adjacent region to heat it to at least the glass transition temperature of the charge transport layer. The seam and the adjacent region are then cooled to a temperature below the glass transition temperature of the charge transport layer or to ambient room temperature. The heat supplied to the seam and adjacent region may be supplied from the direction of the supporting arcuate surface, or from the opposite side of the web toward the arcuate surface or from both sides. If desired, the plurality of welded seams may be heated simultaneously.

Determination of whether the glass transition temperature of the charge transport material has been reached and/or exceeded may be readily determined experimentally and would vary depending upon the type of heat source utilized, or by using an infrared sensor. For example, where heat is applied at the interface between an arcuate support surface to a welded seam, measurement of the temperature of the charge transport layer polymer matrix may be accomplished by any suitable infrared heat sensing device.

Generally, the belt is under minimal tension during the heating and cooling process. However, where the web is supported on an arcuate surface to achieve the arc profile, sufficient tension should be applied to ensure that the allotted seam and adjacent regions conform to the arcuate surface during the heating and cooling processes.

Any suitable technique may be utilized to cool the charge transport layer temperature below glass transition temperature after the heat process. Cooling may be effected slowly under ambient conditions or may be rapidly cooled techniques such as quenching. The rate of cooling does not appear to be critical. However, it is important that the portion of the web bent into the shape of the arc is maintained in this shape until the charge transport layer matrix is cooled to a temperature below glass transition temperature.

The process of this invention is to eliminate bending stress and minimize cracking of the welded photoreceptor belt when cycling over small diameter rollers. Moreover, the heat treatment step of this process does not adversely effect the electrical properties of the photoreceptor. Since cracking is not a problem when the charge transport layer or dielectric imaging layer is under compression, the heat treated portions of charge transport layer or dielectric imaging layer is unaffected when cycled though any straight, flat runs between roller supports.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

A photoconductive imaging member web was prepared by providing a titanium coated polyester (Melinex, available from ICI Inc.) substrate having a thickness of 3 mils and applying thereto, using a Bird applicator, a solution containing 2.592 gm 3-aminopropyltriethoxysilane, 0.784 gm acetic acid, 180 gm of 190 proof denatured alcohol and 77.3 gm heptane. This layer was then allowed to dry for 5 minutes at room temperature and 5 minutes at 135° C. in a forced air oven. The resulting blocking layer had a dry thickness of 0.01 micrometer.

An adhesive interface layer was then prepared by the applying to the blocking layer a coating having a wet thickness of 0.5 mil and containing 0.5 percent by weight based on the total weight of the solution of polyester adhesive (DuPont 49,000, available from E. I. du Pont de Nemours & Co.) in a 70:30 volume ratio mixture of tetrahydrofuran/cyclohexanone with a Bird applicator. The adhesive interface layer was allowed to dry for 1 minute at room temperature and 5 minutes at 135° C. in a forced air oven. The resulting adhesive interface layer had a dry thickness of 0.05 micrometer.

The adhesive interface layer was thereafter coated with a photogenerating layer containing 7.5 percent by volume trigonal Se, 25 percent by volume N,N'-diphenyl-N,N'-bis(3-methylphenyl)-1,1'-biphenyl-4,4'-diamine, and 67.5 percent by volume polyvinylcarbazole. This photogenerating layer was prepared by introducing 0.8 gram polyvinyl carbazole and 14 ml of a 1:1 volume ratio of a mixture of tetrahydrofuran and toluene into a 2 oz. amber bottle. To this solution was added 0.8 gram of trigonal selenium and 100 grams of ⅛ inch diameter stainless steel shot. This mixture was then placed on a ball mill for 72 to 96 hours. Subsequently, 5 grams of the resulting slurry were added to a solution of 0.36 gm of polyvinyl carbazole and 0.20 gm of N,N'-diphenyl-N,N'-bis(3-methylphenyl)-1,1'-biphenyl-4,4'-diamine in 7.5 ml of 1:1 volume ratio of tetrahydrofuran/toluene. This slurry was then placed on a shaker for 10 minutes. The resulting slurry was thereafter applied to the adhesive interface with a Bird applicator to form a layer having a wet thickness of 0.5 mil. The layer was dried at 135° C. for 5 minutes in a forced air oven to form a dry thickness photogenerating layer having a thickness of 2.0 micrometers.

This photogenerator layer was overcoated with a charge transport layer. The charge transport layer was prepared by introducing into an amber glass bottle in a weight ratio of 1:1 N,N'-diphenyl-N,N'-bis(3-methylphenyl)-1,1'-biphenyl-4,4'-diamine and Makrolon 5705, a polycarbonate resin having a molecular weight of 120,000 commercially available from Farbenfabricken Bayer A. G. The resulting mixture was dissolved in methylene chloride to form a 15 percent by weight coating solution. This solution was applied on the photogenerator layer to yield a coating which upon drying had a thickness of 24 micrometers. During this coating process the humidity was equal to or less than 15 percent.

An anti-curl coating was prepared by combining 8.82 gm of polycarbonate resin (Makrolon 5705, 8.18 percent by weight solids, available from Bayer AG), 0.09 gm of polyester resin (Vitel PE 100, available from Goodyear Tire and Rubber Co.), and 90.07 gm of methylene chloride in a plastic container to form a coating solution containing 8.9 percent solids. The container was covered tightly and placed on a roll mill for about 24 hours to ensure that the polycarbonate and polyester were dissolved in the methylene chloride. The anti-curl coating solution was applied to the rear surface (side opposite the photogenerator layer and charge transport layer) of the polyester substrate and dried at 135° C. for about 5 minutes to produce a dried film having a thickness of 13.5 micrometers.

EXAMPLE II

The photoconductive imaging member web of Example I was cut into strips 5.1 cm wide and 30.5 cm long. These strips were wrapped around a plastic tube having a 20 millimeter outside diameter. The charge transport layer of the wrapped photoconductive imaging member faced outwardly. The wrapped mandrel was heated to 90° C. in a forced air oven to soften the polymer matrix of the charge transport layer for 5 minutes. Since the glass transition temperature ($T_g$) of the polymer matrix of the charge transport layer was 81° C., it behaved as a viscous liquid at the elevated temperature of 90° C. Because of the viscous liquid condition of the charge transport layer, the induced bending stress in the charge transport layer was dissipated through molecular chain movement. The wrapped photoconductive imaging member was removed from the forced air oven and allowed to cool to ambient room temperature. As the temperature of the wrapped photoconductive imaging member reached the Tg of the polymer matrix, the polymer matrix solidified into a stress/strain free state while in a curved configuration having a radius of curvature of about 10 millimeters.

EXAMPLE III

The photoconductive imaging members of Examples I and II were cut to form a 2.54 cm × 30.5 cm and tested for dynamic fatigue charge transport layer cracking resistance. Testing was effected by means of a dynamic mechanical cycling device in which each imaging sample was flexed over idler rolls to simulate photoconductive imaging member belt machine cycling conditions. More specifically, one end of an imaging test sample was clamped to a stationary post and the sample was looped upwardly over three equally spaced horizontal idler rolls and then downwardly to form a generally inverted "U" shaped path with the free end of the sample attached to a 1 pound weight to provide a one pound per inch sample width tension. The face of the test sample bearing the charge transport layer faced upwardly such that it was subjected to the maximum induced bending stress as the sample was flexed over the idler rolls. Each idler roll had a diameter of 19 millimeters (mm) and was attached at each end to an adjacent vertical surface of a pair of disks that were rotatable, by means of an electric motor, about a shaft connecting the centers of the disks. The three idler rolls were parallel to and equidistant from each other. The idler rolls were also equidistant from the shaft connecting the centers of the disk.

Although the disks were rotated about the shaft, each idler roll was secured to the disks and freely rotated around each individual roll axis. Thus, as the disks rotated about the shaft, two idler rolls were maintained at all times in contact with the back surface of the test sample. The axis of each idler roll was positioned about 4 cm from the shaft. The direction of movement of the idler rolls along the back surface of the test sample was away from the weighted end of the test sample and toward the end that clamped to the stationary post. Since there were three idler rolls in the test device, each complete rotation of the disks was equivalent to three bending flexes. The rotation of the spinning disks was adjusted to provide the equivalent of 28.7 cm (11.3 inches) per second tangent speed. The appearance of dynamic fatigue cracking of the charge transport layer was examined at intervals of 10,000 flexes using a reflection optical microscope at 100× magnification.

The results of dynamic fatigue charge transport layer cracking listed in Table I below show that the charge transport layer cracking resistance of the photoconductive imaging sample of the present invention was significantly improved over the standard control photoconductive imaging sample. The greatly superior charge transport layer cracking resistance observed in the imaging sample of this invention is due to the seam stress release process which eliminates the bending stress effects from the charge transport layer when the imaging member is flexed over the small diameter rollers.

TABLE I

| Example | Fatigue Charge Transport Layer Cracking (Flexes) |
|---|---|
| I Stnd Control | 170,000* |
| II | >1,000,000** |

*Crack initiation in the charge transport layer was evident at about 170,000 flexes.
**Flexural fatigue cycling stopped, not because of any cracking, but to provide time for testing a control sample.

The results shown in the above Table I demonstrate that the photoconductive imaging member of this invention has a life more than 588 percent greater than that of the control photoconductive imaging member.

EXAMPLE IV

Photoconductive imaging member webs prepared as described in Example I were welded by conventional ultrasonic welding techniques. Opposite ends of each web overlapped for a distance of about 1.2 millimeters were placed on an anvil and welded by contact with a traversing ultrasonic welding horn vibrating at about 20 KHz to form a welded belt having a width of about 335 mm and a circumference of about 590 mm.

EXAMPLE V

One of the welded belts described in Example IV was suspended from a horizontal cylindrical rod having a diameter of 19 mm with the welded seam parked along the top of the rod. A light weight 7.6 cm diameter metallic tube was inserted inside the belt and hung at the bottom in order to ensure conformance of the welded seam and regions adjacent the seam to the outer arcuate surface of the rod. The temperature of the seam was then elevated locally to 90° C. by a stream of hot air from a heat gun directed against the seam along its entire length. The temperature of the welded seam and regions adjacent the seam were elevated to about 89° C. which was about 8° C. higher than the Tg of the polymer matrix of the charge transport layer. The charge transport layer softened and behaved as a viscous liquid which allowed the stress to dissipate through molecular chain movement. After the heat treatment, the suspended belt was allowed to cool to ambient room temperature. As the temperature of the suspended belt reached the Tg of the polymer matrix, the polymer matrix solidified into a stress/strain free state in a 2.5 cm wide segment running along the welded seam of the belt. This segment exhibited a curved configuration having a radius of curvature of about 9.5 mm.

EXAMPLE VI

A control belt described in Example IV and the heat treated belt of this invention described in Example V were mounted on a belt module comprising a pair of rollers, each having a diameter of 19 millimeters. One of the rollers was a drive roller and the other was an idler roller. The belts were cycled around these rollers at a rate of 15 cycles per minute. These belts were then periodically examined for seam cracking under 10× magnification at fixed time intervals. The dynamic cycling results observed, where length of seam cracking was measured as a function of fatigue time, are tabulated in the Table below:

TABLE II

| | DYNAMIC FATIGUE TEST TIME INTERVAL (hrs.) | | | | | | | | | |
|---|---|---|---|---|---|---|---|---|---|---|
| BELT | 0 | 24 | 48 | 70 | 90 | 115 | 140 | 160 | 190 | 336 | 550 |
| IV (Control) | 0 | 2 mm | 5 | 10 | 22 | 85 | 125 | 183 | 251 | — | — |
| V | 0 | 0 | 0 | 0 | 0 | 0 | 0 | 0 | 0 | 0 | 1.5 mm |

These results show that the seam of the control belt started to develop a 2 millimeter crack after 24 hours of cycling. These failures were seen to progressively propagate to become a catastrophe at 115 hours; by 190 hours the testing had to be stopped because the seam had reached a point where 75 percent of the seam across the width of the belt was found to have cracked. By contrast, the heat stress release treated seam of this invention exhibited superb dynamic fatigue performance without any observable seam cracking up to 336 hours of testing and a small 1.5 millimeter crack became evident only after 550 hours of continuous cycling.

EXAMPLE VII

A control photoconductive imaging member of Example I and a photoconductive imaging member of Example II (the imaging member of this invention) were evaluated for their electrophotographic performances using a xerographic scanner at 21° C. and 40 percent relative humidity. The results obtained, after 50,000 cycles of testing, the charge acceptance, dark decay potential, background and residual voltages, photosensitivity, photoinduced discharge characteristics, and long term electrical cyclic stability, for the imaging member of this invention were equivalent to those obtained for the control imaging member of Example I, indicating that the photoelectrical integrity of the original photoconductive imaging member had been maintained.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A process for treating a flexible electrostatographic imaging web comprising providing a imaging web comprising a flexible base layer and a coating, said coating comprising a thermoplastic polymer matrix, forming at least a segment of said web into an arc having a radius of curvature between about 10 millimeters and about 25 millimeters measured along the inwardly facing exposed surface of said base layer, said arc having an imaginary axis which traverses the width of said web, heating at least said polymer matrix in said segment to at least the glass transition temperature of said polymer matrix, and cooling said imaging web to a temperature below said glass transition temperature of said polymer matrix while maintaining the shape of said arc.

2. A process according to claim 1 wherein said web is rolled into a cylindrically shaped hollow roll in which the exposed surface of said base layer forms an arc having a radius of curvature between about 10 millimeters and about 25 millimeters.

3. A process according to claim 2 including heating said cylindrically shaped hollow roll to at least the glass transition temperature of said polymer matrix.

4. A process according to claim 1 including overlapping opposite ends of said web to form an overlapped joint, supporting said joint and adjacent regions on each side of said joint on a curved surface of a temporary support having a radius of curvature between about 10 millimeters and about 25 millimeters to form said arc, and ultrasonically welding said overlapped joint to heat at least said polymer matrix in said arc to at least the glass transition temperature of said polymer matrix while maintaining the shape of said arc.

5. A process according to claim 1 including overlapping opposite ends of said web to form an overlapped joint, welding said overlapped joint to form a welded seam, supporting said seam and adjacent regions on each side of said seam on a curved surface of a temporary support having a radius of curvature between about 10 millimeters and about 25 millimeters to form said arc, heating said polymer matrix in said arc to at least said glass transition temperature of said polymer matrix while maintaining the shape of said arc.

6. A process according to claim 5 wherein each of said adjacent regions extend from the centerline of said seam for a distance of between about 2.5 millimeters and about 7 millimeters.

7. A process according to claim 5 including heating said arc to at least the glass transition temperature of said polymer matrix by contact heating.

8. A process according to claim 1 wherein said electrostatographic imaging web comprises a support layer and a dielectric imaging coating comprising said polymer matrix.

9. A process according to claim 1 wherein said electrostatographic imaging web comprises a support layer, a charge generating layer, and a charge transport coating comprising said polymer matrix.

10. A process according to claim 1 wherein the length of said arc is between about 12 millimeters and about 28 millimeters.

11. A process according to claim 10 wherein a welded seam is substantially centered in said arc.

12. A process according to claim 1 including heating at least said polymer matrix in said arc to a temperature between about the glass transition temperature of said polymer matrix and about 15° C. above the glass transition temperature of said polymer matrix.

13. A process according to claim 1 including heating at least said polymer matrix in said arc to a temperature between about 4° C. and about 10° C. above the glass transition temperature of said polymer matrix.

14. A process according to claim 1 including heating at least said polymer matrix in said arc to a temperature between about 5° C. and about 8° C. above the glass transition temperature of said polymer matrix.

15. A process according to claim 1 including applying heat to said exposed surface of said base layer of at least said arc.

16. A process according to claim 1 including applying heat to the side of said layer comprising a thermoplastic polymer matrix facing away from said base layer.

* * * * *